United States Patent [19] [11] 3,981,686
Lobunez et al. [45] Sept. 21, 1976

[54] CLARIFIER PROCESS FOR PRODUCING SODIUM CARBONATE

[75] Inventors: Walter Lobunez, Princeton, N.J.; Nam Kyun Kim, Green River, Wyo.; Eric Rau, Trenton, N.J.

[73] Assignee: Intermountain Research and Development Corporation, Green River, Wyo.

[22] Filed: Oct. 24, 1974

[21] Appl. No.: 517,472

[52] U.S. Cl. .............................. 23/302 T; 23/300; 209/5; 423/206 T; 423/421; 423/422; 423/425
[51] Int. Cl.² ...................... C01B 7/00; C01B 7/14; B01D 9/02; C01B 7/24
[58] Field of Search .............. 23/302 T, 300; 209/5, 209/166; 423/421, 422, 423, 425, 426, 206 T

[56] References Cited
UNITED STATES PATENTS

| 2,952,358 | 9/1960 | Shoeld | 209/166 |
| 3,084,026 | 4/1963 | Fruit | 23/302 T |
| 3,233,983 | 2/1966 | Bauer | 23/302 X |
| 3,669,915 | 6/1972 | Jones | 209/5 |
| 3,725,014 | 4/1973 | Poncha | 23/302 T |
| 3,836,628 | 9/1974 | Illardi | 23/302 T |

OTHER PUBLICATIONS

Hackh's Chemical Dictionary, 4th Ed., Grant, 1969, pp. 634 and 635.

*Primary Examiner*—Stephen J. Emery

[57] ABSTRACT

Method for clarifying a carbonate process solution containing suspended insolubles which solution is used in the preparation of crystals selected from the group consisting of sodium bicarbonate, sodium sesquicarbonate, anhydrous sodium carbonate, and sodium carbonate monohydrate, which comprises dispersing in the carbonate process solution prior to crystallization a cationic flocculating agent comprising a substituted guar gum containing one quaternary ammonium group per 2 to 12 monosaccharide units to agglomerate the suspended insolubles so the suspended insolubles will readily settle out of the carbonate process solution.

7 Claims, 2 Drawing Figures

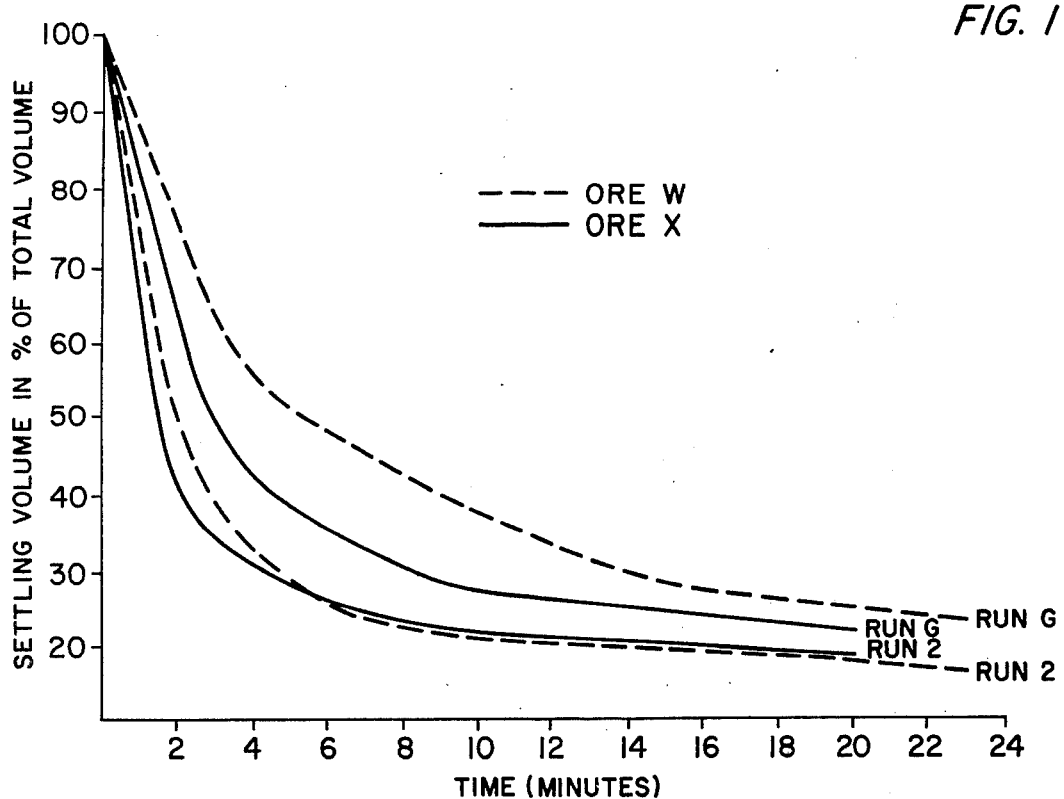
FIG. I
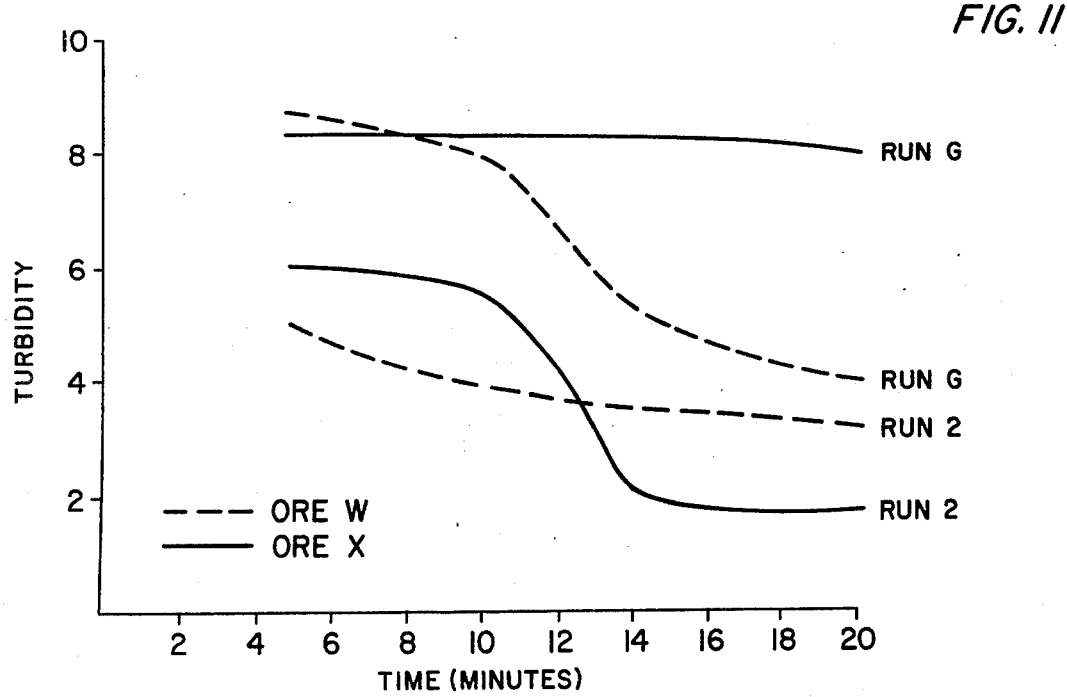
FIG. II

CLARIFIER PROCESS FOR PRODUCING SODIUM CARBONATE

This invention relates to a process for clarifying a carbonate process solution used in the preparation of sodium bicarbonate, sodium sesquicarbonate, anhydrous sodium carbonate or sodium carbonate monohydrate crystals.

In Sweetwater and adjacent counties in the vicinity of Green River, Wyoming, in the Green River formation extending into Colorado and Utah, as well as in other locations, crude ore deposits in the form of trona ($Na_2CO_3 \cdot NaHCO_3 \cdot 2H_2O$), nahcolite ($NaHCO_3$), thermonatrite ($Na_2CO_3 \cdot H_2O$), and dawsonite ($NaAlCO_3(OH)_2$) are found at various depths ranging from about 800 to about 1800 feet underground. These ore deposits are generally either found in beds separated by layers of shale or are found dispersed in lenses along with dawsonite and shale. Most of these crude ores, besides containing recoverable sodium carbonate values, also contain some sodium sulfate, sodium chloride, different percentages of insoluble and organic matter such as kerogenaceous material containing monocarboxylic acids, dicarboxylic acids, unsaturated acids, steroids and rosin acids. A typical analysis of crude trona from which the larger pieces of shale have been removed is:

| Constituent | Percent |
| --- | --- |
| $Na_2CO_3$ | 43.51 |
| $NaHCO_3$ | 36.11 |
| $H_2O$ | 13.14 |
| $Na_2SO_4$ | 0.02 |
| $NaCl$ | 0.08 |
| $Fe_2O_3$ | 0.14 |
| Organic Matter | 0.30 |
| Insolubles | 6.70 |

Various processes have been proposed to prepare crystals of sodium bicarbonate, sodium sesquicarbonate, anhydrous sodium carbonate or sodium carbonate monohydrate from crude ores. One process for producing sodium carbonate from crude trona, known as the monohydrate process, is disclosed in U.S. Pat. No. 2,962,348 issued to Seglin et al on Nov. 29, 1960. In this process, crude trona, after being crushed and screened, is calcined directly to form crude sodium carbonate. The crude sodium carbonate is dissolved in an aqueous solvent to form a substantially saturated solution of crude sodium carbonate containing suspended insolubles consisting essentially of large coarse particles and insoluble solids comprising colloidal particles and insoluble particles which remain in suspension for long periods of time. The crude sodium carbonate solution is then clarified and/or filtered to remove most of the suspended insolubles. The clarified and/or filtered solution is then crystallized, preferably in multiple evaporative crystallizers to form sodium carbonate monohydrate crystals. The monohydrate crystals are then calcined to produce a dense, organic-free soda ash.

Another process is the sesquicarbonate process, disclosed in U.S. Pat. Nos. 2,770,524 and 2,780,520. In this process, crude trona after being crushed and screened is dissolved in a hot recirculating mother liquor carrying more sodium carbonate than sodium bicarbonate so that the sodium carbonate and sodium bicarbonate in the mined trona is dissolved congruently. The suspended insolubles consisting of large coarse particles and attached thereto insoluble solids present in the solution are first settled out of the solution in clarifiers. The remainder of the insoluble solids are then removed by filtration. Sodium sesquicarbonate is then crystallized and separated from the hot solution and calcined to sodium carbonate. The mother liquor remaining after crystallization is reheated and returned to the dissolving tanks to dissolve more trona.

When producing sodium carbonate in a commercial plant designed to produce 1,400 tons of sodium carbonate per day, a flow rate of approximately 1,200 gallons per minute of a carbonate process solution is required to pass through the dissolvers, clarifiers and crystallizers. With this high flow rate, it has been difficult to produce properly clarified solutions in the clarifiers. As a result, the clarifier overflow contains high amounts of insoluble solids necessitating the use of excessive amounts of filter aids or multiple filter stations to produce clear carbonate process solutions. Excessive filter loading has reduced the length of filter cycles between cleaning operations, and requires frequent filter washings with the concomitant discard of carbonate process solutions contained in the filter. These insoluble solids comprising colloidal particles and insoluble particles which remain in suspension for long periods of time, if not removed prior to crystallization, interfere with crystal growth during crystallization. Crystal growth is modified to such an extent that when the crystals are calcined to sodium carbonate they produce a fine particle size material having limited utility which material is consequently not readily saleable.

Various attempts have been made to remove the insoluble solids from carbonate process solutions. British Patent 1,211,984 and U.S. Pat. No. 3,725,014 broadly disclose adding flocculants to carbonate process solutions containing undissolved grit and mud to assist in the coagulation and settling of insoluble solids. U.S. Pat. No. 3,486,844 discloses the use of a water-soluble carbohydrate gum as a flocculating agent to obtain the desired settling rate of the insolubles. U.S. Pat. No. 3,084,026 discloses the use of hydrophylic colloids as flocculating agents to flocculate, settle and remove colloidal fines from carbonate process solutions.

An improved method has been unexpectedly discovered for clarifying a carbonate process solution used in the preparation of crystals selected from the group consisting of sodium bicarbonate, sodium sesquicarbonate, anhydrous sodium carbonate, and sodium carbonate monohydrate, which comprises forming a carbonate process solution containing suspended insolubles and a material selected from the group consisting of sodium carbonate and sodium bicarbonate; dispersing in the carbonate process solution about 1 to about 20 ppm of a cationic flocculating agent comprising a substituted guar gum containing 1 quaternary ammonium group per 2 to 12 monosaccharide units; agglomerating the suspended insolubles by forming agglomerated particles of increased size and density; settling and removing the agglomerating particles from the carbonate process solution; and crystallizing the clarified carbonate process solution to produce crystals selected from the group consisting of sodium bicarbonate, sodium sesquicarbonate, anhydrous sodium carbonate and sodium carbonate monohydrate.

The phrase "carbonate process solution," as used herein refers to aqueous solutions containing at least sodium carbonate and/or sodium bicarbonate, from which solution crystals of sodium bicarbonate, sodium sesquicarbonate, anhydrous sodium carbonate, and sodium carbonate monohydrate can be obtained as the stable crystal phase and can be recovered from the mother liquor. The carbonate process solution is preferably derived from trona, even though it may also be derived from other natural minerals such as nahcolite, thermonatrite, and dawsonite. The carbonate process solution is prepared by conventional procedures well known in the prior art, including the typical trona processing process discussed herein.

In the drawing, FIG. I represents a graphic showing of the settling volume versus time according to Example 2. FIG. II represents a graphic showing of the turbidity versus time according to Example 2.

By contacting a carbonate process solution with the cationic flocculating agent comprising a substituted guar gum containing a quaternary ammonium group per 2 to 12 monosaccharide units, important advantages in the clarifier operation are obtained. To begin with, the sedimentation rate is significantly reduced to less than 30 minutes from approximately 10 hours which is the conventional settling time when no flocculant is employed. Secondly, the turbidity of the carbonate process solution remaining above the settled agglomerated particles, that is the muds or gangue, is substantially reduced by approximately 25% over that obtained by conventional flocculating agents. Thirdly, the muds or gangue settled from the carbonate process solution is approximately 10% more compacted than those obtained with conventional flocculating agents. The increased sedimentation rate and decreased carbonate process solution turbidity permits rapid filling of the clarifier with the carbonate process solution containing the suspended insolubles and rapid withdrawal of the carbonate process solution substantially free of suspended insolubles. In addition, the reduction in solution turbidity significantly reduces subsequent filter workloads. The increase in mud compactness is significant since this means that approximately 10% more carbonate process solution may be withdrawn from the clarifier and passed to the crystallizers. More compactness also means that there is less sodium carbonate and/or sodium bicarbonate trapped in the muds; this means that less is lost when the muds are discarded.

The flocculating agents employed in the invention are cationic flocculating agents comprising a substituted guar gum containing one quaternary ammonium group per 2 to 12 monosaccharide units. The preferred cationic flocculating agents are substituted guar gums containing one quaternary ammonium group for every 5 to 9 monosaccharide units wherein the quaternary ammonium ion is a trimethyl amine. Most preferably, the flocculating agent is a substituted guar gum containing one unit of 2-hydroxy propyl trimethyl ammonium hydroxide for every 5 to 9 monosaccharide units.

These flocculating agents may be prepared by mixing 1.0 gram of a guar gum, such as Jaguar MDD, manufactured by Stein-Hall Corporation with 100 milliliters of distilled water. A 10% sodium hydroxide solution containing about 0.15 grams sodium hydroxide is then added and the solution is stirred. The stirred solution is heated between about 50° and 80°C. An aqueous solution containing the quaternary ammonium compound, which is preferably a quaternary ammonium chloride group, is then added to the solution in amounts to substitute on the guar gum one quaternary ammonium group per 2 to 12 monosaccharide units. The reaction mixture temperature is then maintained between about 50° and 80°C for 2 to 24 hours. Upon termination of the reaction the flocculating agent is purified by conventional means, such as by dialysis, and dried if necessary. The preferred flocculating agent, that is the 2-hydroxy propyl trimethyl ammonium hydroxide substituted guar gum, is prepared by adding an aqueous solution containing 0.16 grams of 3-chloro-2-hydroxy propyl trimethyl ammonium chloride

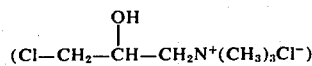

to the stirred solution containing the guar gum.

Guar gum is derived from the seed of the guar plant, Cyamopsis Tetragonolobus. It is a nonionic polymer of galactose and mannose and appears as the polysaccharide galactomannan. Guar gum galactomannan is composed of a straight chain of D-mannopyranose units with single-membered branches of D-galactopyranose units. The D-galactopyranose units are joined by $\beta(1 \rightarrow 4)$ linkages and single D-galactopyranose units are joined to this chain by $\alpha(1 \rightarrow 6)$ linkages. The average molecular weight of guar gum is about 220,000.

The flocculating agent may be added directly to the clarifier, and dispersed throughout the carbonate process solution by conventional agitation or mixing procedures and/or means. Agitation is needed to disperse the flocculating agent so that the agent may contact substantially all of the insoluble solids. The extent of agitation depends upon such factors as clarifier size and the amount of suspended insolubles present in the carbonate process solution. Agitation times of about 15 seconds are satisfactory, even though agitation may optionally be performed throughout the entire time the carbonate process solution is present in the clarifier.

Alternatively, the flocculating agent is added directly to the clarifier feed line and dispersed within the carbonate process solution as it passes through the clarifier feed line. The turbulence of the carbonate process solution as it moves through the clarifier feed line rapidly distributes the flocculating agent throughout the carbonate process solution before the solution enters the clarifier. This procedure is preferred because it provides for the rapid and efficient contact of the flocculating agent and the insoluble solids present in the carbonate process solution prior to entering the clarifier.

When the carbonate process solution is contacted with the flocculating agent, the insoluble solids become entrapped upon the flocculating agent and form agglomerated particles of increased size and density. These agglomerated particles are large flocs that quickly settle out of the carbonate process solution, for example within 30 minutes. The solution remaining above the settled material is a relatively clear carbonate process solution containing approximately 0.01% insoluble solids. This solution may then be passed to the crystallizers for further treatment.

The flocculating agent is added to the carbonate process solution in an amount that will agglomerate substantially all of the insoluble solids. Generally, between about 1 and about 20 parts, and preferably about 1 to about 10 parts, and most preferably about 2 to about 5 parts of flocculant per one million parts of carbonate process solution based upon the weight of the carbonate process solution is sufficient to agglomerate substantially all of the insoluble solids within 30 minutes. The amount of flocculant added is based upon the average amount of insoluble solids present in the carbonate process solution. Amounts of flocculant above about 20 ppm may be employed even though no substantial benefits are obtained. It is important, however, to use enough flocculant to facilitate complete and rapid agglomeration of the insoluble solids.

The flocculating agent is added to the carbonate process solution either all at one time or gradually. It is preferred to add the flocculating agent gradually in order to permit rapid and complete dispersion of the flocculant throughout the carbonate process solution. It is also preferable to dissolve the flocculant in water and add the resulting solution to the carbonate process solution. The flocculant-containing solution is preferably dilute, that is containing from 0.01 to 0.2% by weight flocculant. Flocculant solutions having concentrations above this amount may also be employed even though they are not preferred.

Following clarification the solution may optionally be filtered to remove the remaining insolubles and froth present in the clarifier overflow. The amount of insoluble solids in the solution generally varies with the residence time of the carbonate process solution in the clarifier. Residence times of approximately 5 minutes to 30 minutes are commercially acceptable in lowering the insoluble solids concentration of the carbonate process solution from approximately 3% to approximately 0.01%. Residence times longer than 30 minutes may be employed even though only minor additional amounts of the insoluble solids will be removed from the carbonate process solution.

When crystal growth modifiers are added to the carbonate process solution either prior to or during crystallization, it is possible that the flocculating agent present in the carbonate process solution may have an antagonistic effect upon crystal growth. If an antagonistic effect does result, the amount of flocculant employed during clarification may be readily regulated so that no residual flocculant is carried with the carbonate process solution to the crystallizers.

In the process of the invention, using the typical trona processing operation as an example, the crude trona is processed to crude sodium carbonate by calcining and converting the sodium sesquicarbonate present in the crude trona to sodium carbonate. This reaction may be presented as follows:

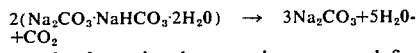

The crude dry-mined trona is prepared for calcination by crushing the mined trona in a crushing apparatus and passing the crushed trona over a screening device or other suitable separating equipment. Particles in the general size range smaller than 1 inch are collected and passed to the calciner. Rejected oversize particles are recycled to the crushing apparatus for further crushing and screening. Proper sizing of the crude trona insures good conversion of the sodium sesquicarbonate therein to sodium carbonate, since oversized particles are not easily converted in the calciner.

The calcination may be carried out at any temperature which is sufficient to convert the trona to sodium carbonate. Generally, calcination temperatures on the order of 150° to 800°C may be employed. If no organic-removal steps are to be used in later processing of the sodium carbonate solution, calcination temperatures of about 400° to 800°C and preferably between 500° and 550°C are sufficient to convert the trona to sodium carbonate. If organic-removal steps are to be utilized, such as by carbon treatment, calcination temperatures on the order of 150° to 350°C, and preferably 150° to 170°C are employed.

The retention time of the crude trona in the calciner is a function of the ore particle size and the temperature of the calciner. At a temperature of 500° to 550°C, a period of about 15 minutes has been found satisfactory. At a temperature of 150° to 170°C, a period of about 50 minutes has been found satisfactory.

A rotary, direct fired calciner may be used, although other type kilns, such as vertical kilns or grate type calciners, are equally suitable.

After the crude trona is calcined, it is passed to the dissolving area where water or a solution of sodium carbonate in water at any desired sodium carbonate concentration, is brought into contact with the crude sodium carbonate to form an aqueous solution of crude sodium carbonate. The water employed may be softened or partially softened water.

When anhydrous sodium carbonate or calcined crude trona is introduced into water or into a solution of sodium carbonate in water at a temperature above 35°C and below 109°C it hydrates to sodium carbonate monohydrate. If the solution is unsaturated the sodium carbonate monohydrate dissolves.

In the preferred process of this invention, the effluent from the dissolvers is a substantially saturated solution of sodium carbonate plus suspended insolubles and is passed to a clarifier. In the clarifier, the large coarse particles, having a size of about 40 mesh (U.S. Standard Sieve) and attached thereto minor amounts of insoluble solids quickly settle to the bottom of the clarifier. Approximately 3% insoluble solids smaller than 40 mesh in size remain suspended in the sodium carbonate solution. A typical analysis of the insoluble solids present in the sodium carbonate solution free of large coarse particles is:

| Constituent | Percent |
| --- | --- |
| Shale | 85.0 |
| Shortite | 5.0 |
| Quartz | 2.0 |
| Montmorillonite Group | >2.0 |
| Searlesite | 2.0 |
| Pyrite | 0.5 |
| Loughlinite | 0.5 |
| Miscellaneous | <3.0 |

The crude sodium carbonate solution passed to the clarifier is then contacted with a flocculating agent as described above to agglomerate the suspended insolubles which quickly settle out of solution resulting in the formation of a clear sodium carbonate solution.

The clear overflow sodium carbonate solution from the clarifier is then passed to the crystallizer, preferably multiple effect evaporative crystallizers, where sufficient heat is supplied to cause boiling and removal of water by evaporation and to form sodium carbonate monohydrate crystals. Any solution adhering to the crystals as they come from the crystallizer is removed in a centrifuge. From the centrifuge, the monohydrate crystals are passed to a calciner or dryer where free water and water of crystallization are removed to form dense sodium carbonate.

The following examples are given merely to illustrate the invention and are not to be considered limiting thereof. All percentages in the examples and the specifications are by weight of total unless otherwise indicated.

EXAMPLE 1

A carbonate process solution containing about 30% sodium carbonate and about 3% insoluble solids was prepared by dissolving trona ore calcined at 150°C for about 150 minutes in 90°C distilled water with agitation for about 30 minutes. The large coarse particles were removed from the agitated carbonate process solution by decantation. The carbonate process solution was divided into equal portions which were poured into mixing vessels. To the carbonate process solutions in the vessels were added various flocculating agents in various concentrations. After the flocculants were added, the vessels were agitated for 15 seconds, and the vessel contents poured into separate graduated cylinders. The volume the sediment occupied in the bottom of the cylinders was measured visually at 5 and 10 minute time intervals. The turbidity of the carbonate process solutions which occupied the upper portion of the cylinders, that is, above the sediment, was measured visually at 5, 10 and 20 minute time intervals with aid of a Brice-Phoenix light scattering apparatus. The turbidity values are based on a scale of 0 to 10 with 0 representing a clear solution and 10 representing the most turbid solution. All results are set forth in Table I.

RUN 1 — PROCESS OF THE INVENTION

In Run 1, a total of 5 ppm of a cationic flocculating agent in solution was added to the carbonate process solution in the mixing vessel. The cationic flocculating agent is a modified guar gum containing one unit of 2-hydroxy propyl trimethyl ammonium hydroxide per 5 to 9 monosaccharide units.

COMPARATIVE RUNS A THROUGH F

In Run A, no flocculant was added. In Run B, a total of 5 ppm of Nalco 7107 in solution was added. Nalco 7107 is a polyamine flocculating agent. In Run C, a total of 10 ppm of Cat-Floc in solution was added, Cat-Floc is a homopolymer of diallyldimethylammonium chloride. In Run D, a total of 4 ppm of Arquad 12–50 in solution was added. Arquad 12–50 is a trimethyl ammonium chloride containing one or two alkyl groups ranging from $C_8$ to $C_{18}$. In Run E, a total of 5 ppm of Jaguar MDD in solution was added. Jaguar MDD is a nonionic guar gum. In Run F, a total of 5 ppm of MRL-22A in solution was added. MRL-22A is a slightly cationic guar gum obtained from Stein-Hall Corp.

EXAMPLE 2

The process of Example 1 was repeated with two different trona ore samples identified as trona ore W and X. After the carbonate process solutions were prepared, each of the solutions were divided into two equal portions. In Run 2 (process of invention), a total of 5 ppm of the cationic flocculating agent in solution employed in Run 1 was added to two mixing vessels containing different carbonate ore process solutions. In Run G (comparative run), a total of 5 ppm of Jaguar MDD in solution was added to the two remaining mixing vessels containing different carbonate ore process solutions. The volume of the sediment in the bottom of the graduated cylinders was measured visually over a 23 minute time interval. The results are set forth in FIG. I. As shown in FIG. I, the cylinders containing the modified guar gum flocculating agent showed a 5 to 30% reduction in sedimentation volume. The turbidity of the carbonate process solutions were measured over a 20 minute time interval. The results are set forth in FIG. II. The cylinders containing the modified guar gum flocculating agent showed a considerable reduction in carbonate process solution turbidity.

TABLE I

| Example 1 | Flocculant Character | Settling Volume in % of Total Volume | | Solution Turbidity* on scale of 0 to 10 | | |
|---|---|---|---|---|---|---|
| | | 5 min. | 10 min. | 5 min. | 10 min. | 20 min. |
| Invention | | | | | | |
| Run 1 | Guar containing quaternary ammonium groups | 42 | 32 | — | 2–5.5 | 2–4 |
| Comparative | | | | | | |
| Run A | None | 96 | 84 | 10 | 9.9 | 9.8 |
| Run B | Polyamines | 54 | 45 | 9 | — | 8 |
| Run C | Polymers of diallyldimethylammonium chloride | 42 | 35.5 | — | 8–8.7 | — |
| Run D | n-alkyl trimethyl ammonium chloride | 97 | 86 | 9.5 | — | 9.3 |
| Run E | nonionic guar | 45 | 36 | 8–9.6 | 6–8.7 | 6–7 |
| Run F | Slightly cationic guar | 59 | 46 | 9.5 | 9 | 8 |

*Blanks indicate that no determination of solution turbidity was made.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for clarifying a carbonate process solution used in the preparation of crystals selected from the group consisting of sodium bicarbonate, sodium sesquicarbonate, anhydrous sodium carbonate and sodium carbonate monohydrate, which comprises:

forming a carbonate process solution containing suspended insolubles and a material selected from the group consisting of sodium carbonate and sodium bicarbonate;

dispersing in the carbonate process solution about 1 to about 20 ppm of a cationic flocculating agent comprising a substituted guar gum containing one quaternary ammonium group per 2 to 12 monosaccharide units;

agglomerating the suspended insolubles by forming agglomerated particles of increased size and density;

settling and removing the agglomerated particles from the carbonate process solution; and crystallizing the clarified carbonate process solution to produce crystals selected from the group consisting of sodium bicarbonate, sodium sesquicarbonate, anhydrous sodium carbonate and sodium carbonate monohydrate.

2. The process of claim 1 wherein said flocculating agent is dispersed in said carbonate process solution as the carbonate process solution passes through a clarifier feed line.

3. The process of claim 1 wherein the flocculating agent is dispersed in said carbonate process solution after the carbonate process solution enters the clarifier.

4. The process of claim 1 wherein about 1 to about 10 ppm of said flocculating agent is dispersed in the carbonate process solution.

5. The process of claim 1 wherein about 2 to about 5 ppm of said flocculating agent is dispersed in the carbonate process solution.

6. The process of claim 1 wherein the cationic flocculating agent derived from guar gum contains one quaternary ammonium group per 5 to 9 monosaccharide units.

7. The process of claim 1 wherein the cationic flocculating agent derived from guar gum contains one unit of 2-hydroxy propyl trimethyl ammonium hydroxide for every 5 to 9 monosaccharide units.

* * * * *

UNITED STATES PATENT OFFICE
CERTIFICATE OF CORRECTION

Patent No. 3,981,686   Dated September 21, 1976

Inventor(s) Walter Lobunez et al.

It is certified that error appears in the above-identified patent and that said Letters Patent are hereby corrected as shown below:

Column 5, lines 55 and 56 "$2(Na_2CO_3NaHCO_3 2H_2O) \rightarrow 3Na_2CO_3 + 5H_2O + CO_2$" to read -- $2(Na_2CO_3NaHCO_3 2H_2O) \rightarrow 3Na_2CO_3 + 5H_2O + CO_2$ --.

Column 7, lines 8 and 9, "specifications" to read

-- specification --.

Column 8, line 28, "were" should read -- was --.

Column 8, Claim 1, line 68, "gum containing" should read -- gum derived from Cyamopsis tetragonoloba containing --.

Signed and Sealed this

Twenty-second Day of March 1977

[SEAL]

Attest:

RUTH C. MASON
*Attesting Officer*

C. MARSHALL DANN
*Commissioner of Patents and Trademarks*